United States Patent [19]
Wenger et al.

[11] Patent Number: 5,602,345
[45] Date of Patent: Feb. 11, 1997

[54] DOUBLE STRAIGHT TUBE CORIOLIS TYPE MASS FLOW SENSOR

[75] Inventors: Alfred Wenger, Neftenbach, Switzerland; Gerhard Eckert, Rheinfelden; Rainer Lorenz, Lörrach, both of Germany; Ennio Bitto, Aesch, Switzerland; Patrick Fleury, Courtételle, Switzerland; Ole Koudal, Reinach, Switzerland

[73] Assignee: Endress + Hauser Flowtec AG, Reinach, Switzerland

[21] Appl. No.: 434,016

[22] Filed: May 3, 1995

[30] Foreign Application Priority Data

May 26, 1994 [EP] European Pat. Off. .............. 94108148
Sep. 19, 1994 [EP] European Pat. Off. .............. 94114725

[51] Int. Cl.$^6$ ..................................................... G01F 1/84
[52] U.S. Cl. ........................................................ 73/861.357
[58] Field of Search ........................... 73/861.37, 861.18, 73/861.31, 861.29, 861.38

[56] References Cited

U.S. PATENT DOCUMENTS

| | | | |
|---|---|---|---|
| 4,090,382 | 5/1978 | Schott . | |
| 4,680,974 | 7/1987 | Simonsen | 73/861.38 |
| 4,768,384 | 9/1988 | Flecken et al. | 73/861.38 |
| 4,768,385 | 9/1988 | Cage | 73/861.37 |
| 4,793,191 | 12/1988 | Flecken et al. . | |
| 4,801,897 | 1/1989 | Flecken . | |
| 4,876,898 | 10/1989 | Cage et al. | 73/861.37 |
| 5,044,207 | 9/1991 | Atkinson et al. | 73/861.38 |
| 5,095,761 | 3/1992 | Nortz et al. . | |

FOREIGN PATENT DOCUMENTS

| | | |
|---|---|---|
| 0263719 | 4/1988 | European Pat. Off. . |
| 2598801 | 11/1987 | France . |
| 3724675 | 2/1989 | Germany . |
| WO88/08517 | 11/1988 | WIPO . |

Primary Examiner—Richard Chilcot
Assistant Examiner—Max H. Noori
Attorney, Agent, or Firm—Bose McKinney & Evans

[57] ABSTRACT

This mass flow sensor, which can be installed in a fluid-carrying conduit of a given diameter so as to be axially aligned with the conduit, and whose production costs are drastically reduced, has an inlet tube and an outlet tube which serve to connect the mass flow sensor with the conduit, an inlet manifold and an outlet manifold, an external support tube whose end portions are fixed with their inside surfaces to the inlet manifold and outlet manifold, respectively, and with their faces to the inlet tube and outlet tube, respectively, two parallel, straight measuring tubes of the same inside diameter and the same wall thickness each having its two end portions fixed in parallel bores of the inlet manifold in alignment with the inlet tube and in parallel bores of the outlet manifold in alignment with the outlet tube, respectively, two node plates interconnecting the two measuring tubes near the inlet manifold and the outlet manifold, respectively, two vibration exciters, one per measuring tube, which excite the measuring tubes into oppositely directed resonance vibrations in only one plane of vibration, and a respective pair of spaced-apart electrodynamic sensors positioned along each of the measuring tubes for sensing the vibrations of the latter.

11 Claims, 3 Drawing Sheets

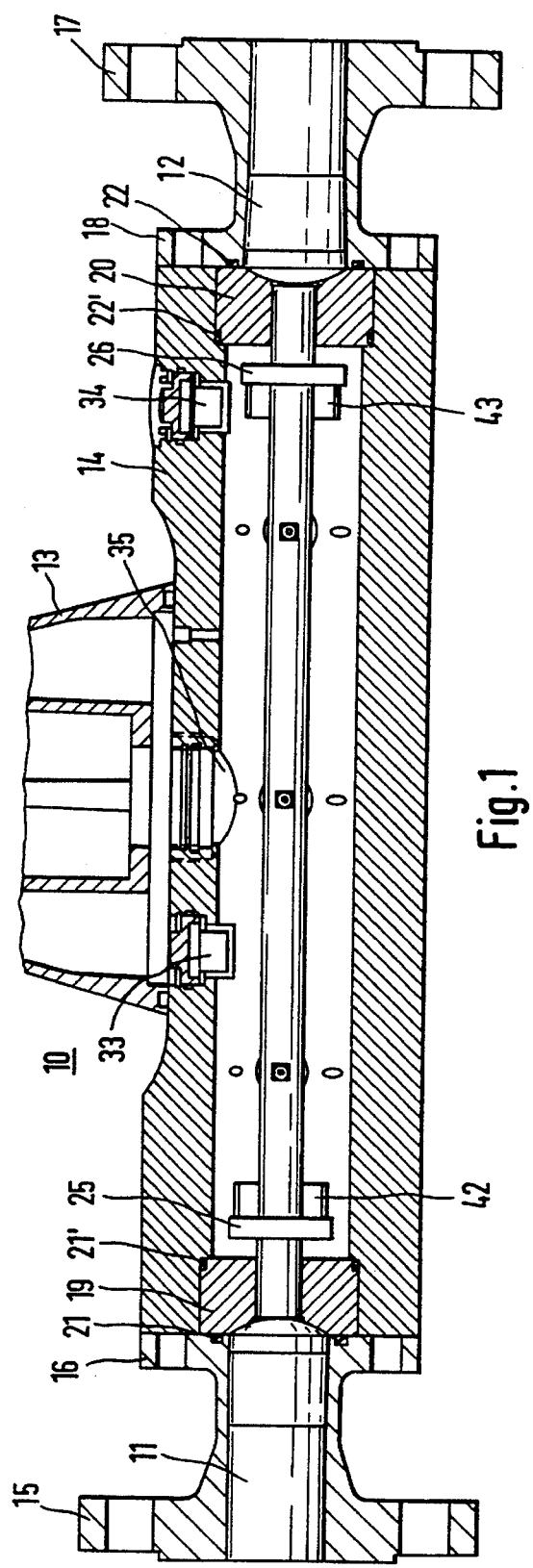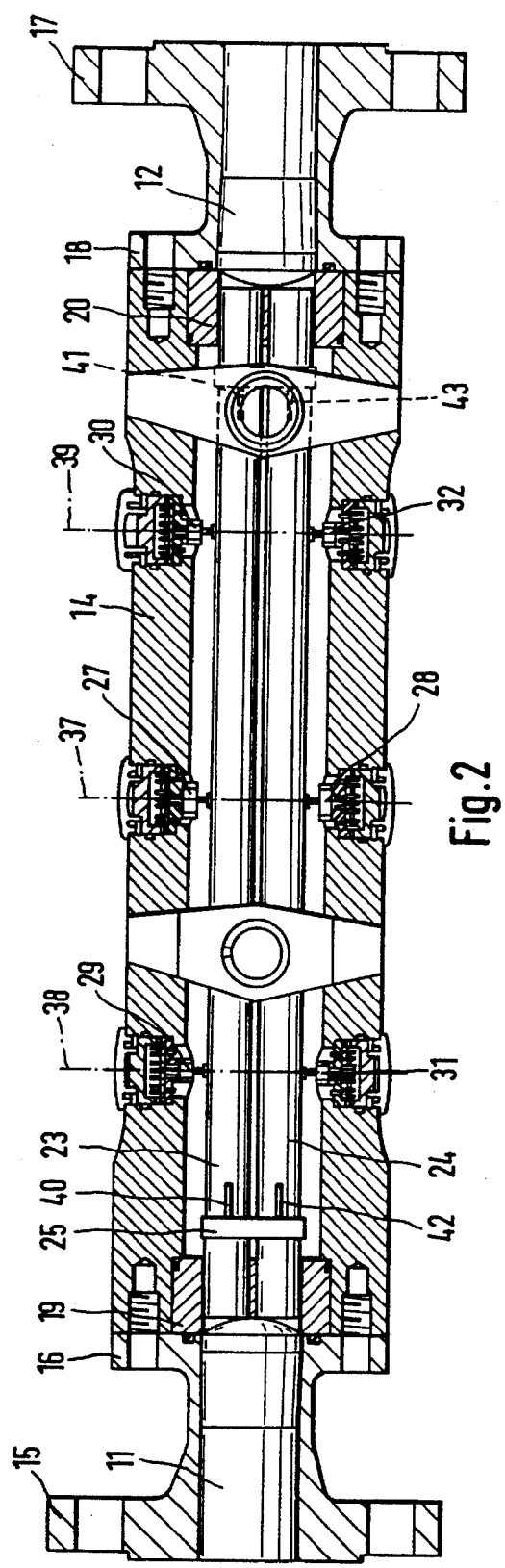

5,602,345

DOUBLE STRAIGHT TUBE CORIOLIS TYPE MASS FLOW SENSOR

FIELD OF THE INVENTION

The present invention relates to a Coriolis-type mass flow sensor having two straight, parallel measuring tubes as vibrating bodies through which a fluid to be measured is passed.

BACKGROUND OF THE INVENTION

Applicant's U.S. Pat. No. 4,793,191 discloses a Coriolis-type mass flow sensor
which can be installed in a conduit of a given diameter so as to be axially aligned with said conduit, which carries a fluid to be measured,
with an inlet tube and an outlet tube
  which serve to connect the mass flow sensor with the conduit,
with an inlet manifold and an outlet manifold,
with an external support tube
  whose ends are fixed to the inlet tube and outlet tube, respectively,
with two annular diaphragms
  via which the inlet and outlet tubes are connected to the inlet manifold and outlet manifold, respectively,
with two parallel, straight measuring tubes of the same inside diameter and the same wall thickness each having its two ends fixed in the inlet manifold and outlet manifold, respectively,
with a vibration exciter
  which excites the measuring tubes into resonance vibrations, and
with two optical sensors spaced along the measuring tubes for sensing the vibrations of the latter.

WO-A-88/08517, particularly in conjunction with FIG. 8 thereof, discloses a Coriolis-type mass flow sensor
which can be installed in a conduit of a given diameter so as to be axially aligned with said conduit, which carries a fluid to be measured,
with an inlet tube and an outlet tube
  which serve to connect the mass flow sensor with the conduit,
with an inlet manifold and an outlet manifold,
with an external support tube
  whose ends are fixed with their inside surfaces via respective intermediate pieces to the inlet manifold and outlet manifold, respectively,
with two parallel, straight measuring tubes of the same inside diameter and the same wall thickness each having its two ends fixed in the inlet manifold and outlet manifold, respectively,
with two pairs of node plates interconnecting the two measuring tubes near the inlet manifold and outlet manifold, respectively,
with two vibration exciters per measuring tube
  which are mounted on the measuring respective tube at the same distance from the center thereof,
  which excite the measuring tubes into oppositely directed resonance vibrations in only one plane of vibration, and
  one pair of which excites resonance vibrations in a direction opposite to that of the vibrations excited by the other pair, and
with two respective electrodynamic sensors spaced along each of the measuring tubes for sensing the vibrations of the latter.

FR-A-2 598 801 discloses a Coriolis-type mass flow sensor
which can be installed in a conduit of a given diameter so as to be axially aligned with said conduit, which carries a fluid to be measured,
with an external support tube,
with a single, straight measuring tube having both ends fixed in the support tube,
with two vibration exciters
  which excite the measuring tube into resonance vibrations in only one plane of vibration, and
with two electrodynamic sensors spaced along the measuring tube for sensing the vibrations of the latter.

SUMMARY OF THE INVENTION

Mass flow meters with such mass flow sensors have proved to be effective in practice, but the current price war in the market is forcing manufacturers to reduce their production costs.

The invention as claimed serves to provide mass flow sensors which, having different parts of a simpler design, can be produced at a lower cost than those delivered so far.

Accordingly, the invention provides a Coriolis-type mass flow sensor
which can be installed in a conduit of a given diameter so as to be axially aligned with said conduit, which carries a fluid to be measured,
with an inlet tube and an outlet tube
  which serve to connect the mass flow sensor with the conduit,
with an inlet manifold and an outlet manifold,
with an external support tube
  whose ends are fixed with their inside surfaces to the inlet manifold and the outlet manifold, respectively, and with their faces to the inlet tube and the outlet tube, respectively,
with two parallel, straight measuring tubes of the same inside diameter and the same wall thickness each having its two ends fixed in parallel bores of the inlet manifold in alignment with the inlet tube and in parallel bores of the outlet manifold in alignment with the outlet tube, respectively,
with two node plates interconnecting the two measuring tubes near the inlet manifold and the outlet manifold, respectively,
with one vibration exciter per measuring tube
  which vibration exciters are mounted opposite each other and excite the measuring tubes into oppositely directed resonance vibrations in only one plane of vibration, and
with a respective pair of spaced-apart electrodynamic sensors positioned along each of the measuring tubes for sensing the vibrations of the measuring tubes, the two pairs of electrodynamic sensors being located opposite each other.

In one embodiment of the invention, the respective vibration exciter is disposed centrally with respect to the length of the measuring tube, on the outer side of the measuring tube remote from the other measuring tube, and on an exciter axis lying in the plane of vibration.

In another embodiment of the invention, the respective sensors associated with one measuring tube are disposed at the same distance from the center of the measuring tube, on the outer side of the measuring tube remote from the other measuring tube, and on a respective sensor axis lying in the plane of vibration.

The two vibration exciters and the four sensors preferably comprise the following parts:

a nonferromagnetic metal plate soldered to the respective measuring tube and having a nonferromagnetic threaded connecting piece, a soft ferromagnetic metal cup whose bottom rises on the inside at the center to form a threaded sleeve into which the threaded connecting piece is screwed, a permanent-magnet disk which is attached, preferably with an adhesive, to the end surface of the threaded sleeve and which is magnetized in the axial direction of the threaded sleeve, and a coil mounted on the support tube by means of a coil holder such that the permanent-magnet disk can move freely in the coil.

The two vibration exciters and the four sensors preferably have the same respective dimensions.

In a further embodiment of the invention, two flat projecting members per measuring tube are provided on the side of each node plate remote from the manifold so as to lie in a plane which is perpendicular to the plane of vibration and contains the axis of the respective measuring tube.

The two measuring tubes, the inlet manifold, the outlet manifold, the node plates, and, if present, the flat projecting members are preferably made of titanium or a titanium alloy or zirconium, and the inlet tube and the outlet tube are preferably made of high-grade steel.

According to another development of the invention, the ends of at least one of the measuring tubes are pressbonded to the walls of the bores in the inlet manifold and outlet manifold, respectively, without heat supply using a rolling tool which is inserted into the respective end.

In a preferred embodiment of this development, the two measuring tubes are press-bonded in the inlet manifold and outlet manifold, respectively, only until they are dynamically optimally balanced.

Through the elimination of the diaphragm contained in the prior art mass flow sensor of U.S. Pat. No. 4,793,191, via which the vibrations of the measuring tube which is set into vibration by the single vibration exciter are transmitted to the other measuring tube, the hitherto complicated three-dimensional shape of the inlet manifold and the outlet manifold is considerably simplified. The production costs of the inlet and outlet manifolds are thus reduced so drastically that the cost of the second vibration exciter, which is now required, is negligible.

A further considerable cost reduction results from the replacement of the prior art optical sensors by the electrodynamic sensors.

Furthermore, since the two measuring tubes are provided with two pairs of sensors and one pair of vibration exciters, the respective coils can be mounted on the support tubes, so that their leads need not be laid along the measuring tubes; this would be necessary if, as is the case with some commercially available mass flow sensors, only a single vibration exciter and only two electrodynamic sensors were provided.

Here, too, the slight additional cost of the further vibration exciter and the two further electrodynamic sensors outweighs the disadvantages of the laying and fixing of leads along the measuring tubes by far. In particular, the effect of the lead routing on the mass and, consequently, the vibration behavior of the measuring tubes is eliminated.

A further advantage of the invention is that a separate housing for the mass flow sensor, as is required for the mass flow sensor disclosed in the above-mentioned U.S. Pat. No. 4,493,191, can be dispensed with, since the support tube can serve as a housing.

BRIEF DESCRIPTION OF THE DRAWINGS

The invention will now be explained in more detail with reference to the accompanying drawings, which shows schematically an embodiment of the invention, and in which:

FIG. 1 is an axial longitudinal section of a mass flow sensor;

FIG. 2 is an axial longitudinal section of the mass flow sensor of FIG. 1 in a plane rotated by 90°;

DETAILED DESCRIPTION OF THE DRAWINGS

Figure 3:
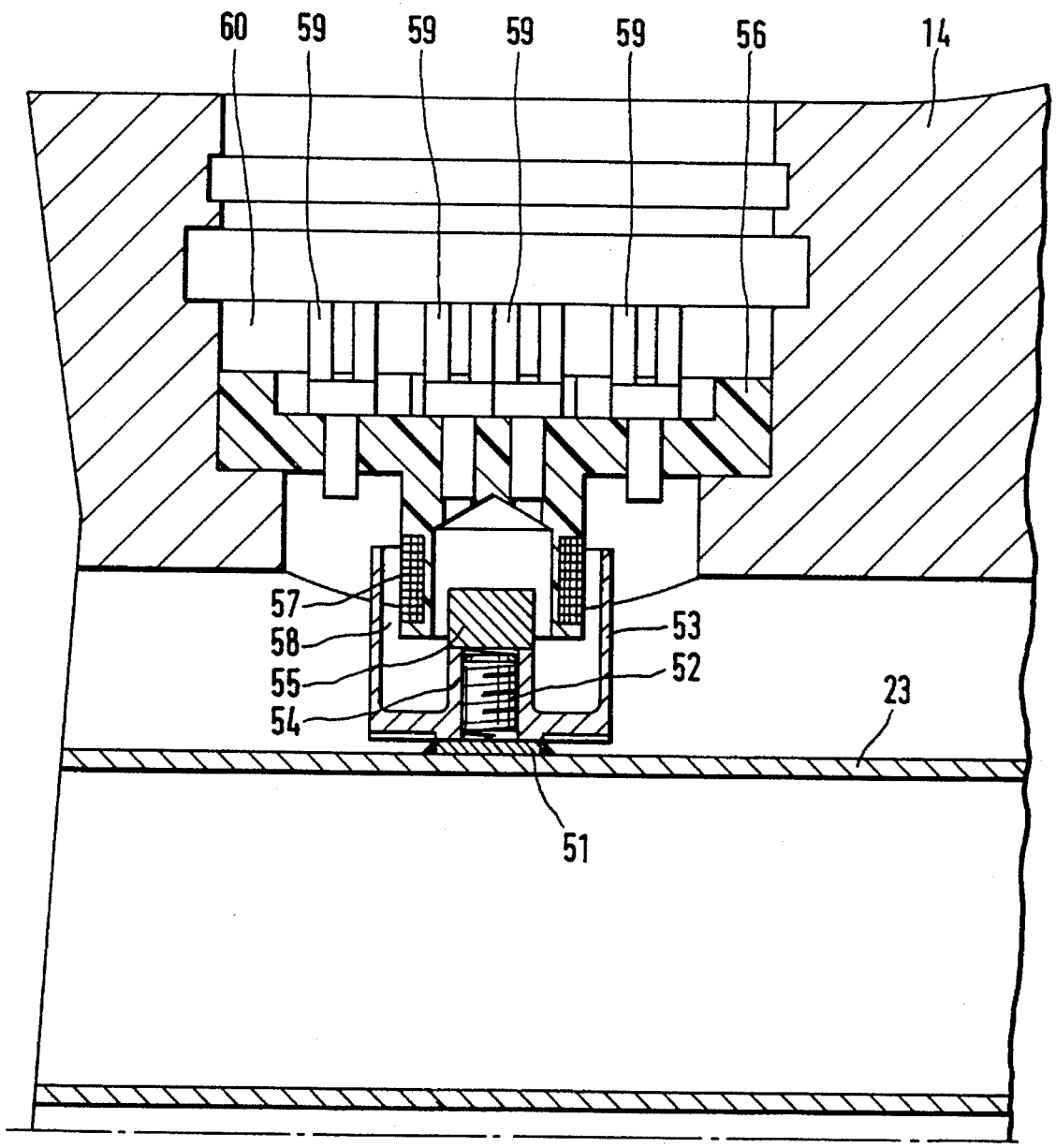
FIG. 3 is a cross-sectional view of the basic structure of an in-situ vibration exciter or electrodynamic sensor.

The mass flow sensor 10 shown in FIG. 1 in an axial longitudinal section, which can be installed in a conduit (not shown) of a given diameter so as to be axially aligned with this conduit, which carries a fluid to be measured, has an inlet tube 11 and an outlet tube 12, which serve to connect the sensor with the conduit. This connection can be made by means of flanges 15, 17, for example, or in another manner.

Via further flanges 16 and 18, inlet tube 11 and outlet tube 12 are attached, preferably screwed, to the ends of a rigid external support tube 14, with a sealing ring 21, 22 provided at each of the joints. Inlet tube 11 and outlet tube 12 combine with the two associated flanges 15, 16 and 17, 18, respectively, to form single connecting pieces, which are forgings or consist of two parts welded together, for example.

In the end portions of the support tube 14, an inlet manifold 19 and an outlet manifold 20 are fixed to the inside wall of the support tube, with a sealing ring 21', 22' provided at each of the joints The inlet manifold 19 and the outlet manifold 20 each have, in the axial direction of the support tube 14, two parallel bores in which the respective ends of two parallel, straight measuring tubes 23, 24 of the same inside diameter and the same wall thickness are fixed in alignment with the inlet tube and outlet tube, respectively.

Near the inlet manifold 19 and the outlet manifold 20, there are provided node plates 25 and 26, respectively, which interconnect the two measuring tubes 23, 24, and by which the portions of the measuring tubes 23, 24 ending in the inlet manifold 19 and the outlet manifold 20 are relieved of vibration-induced alternating stresses.

The support tube 14 has several openings in which, on the one hand, vibration exciters and sensors, which will be explained below, and, on the other hand, a temperature sensor 33 for the temperature of the support tube itself and a temperature sensor 34 for the temperature of the measuring tubes, and thus of the fluid, are mounted. Leads for the vibration exciters and the sensors are passed through an opening 35.

In a preferred embodiment of the invention, the sensors associated with the same measuring tube are located at the same distance from the center of the measuring tube, on the outside of the measuring tube remote from the other measuring tube, and on respective sensor axes lying in the plane of vibration.

The upper part of FIG. 1 shows part of the base of a holder 13 to which a housing (not shown) for evaluation, drive, and display electronics is attached.

In FIG. 2, which shows an axial longitudinal section of the mass flow sensor of FIG. 1 in a plane rotated by 90°, one vibration exciter 27, 28 per measuring tube 23, 24 is fixed at the center of the respective measuring tube. These vibration exciters set the measuring tubes 23, 24 into oppositely directed resonance vibrations in only one plane, which is the plane of the paper in FIG. 2.

The respective vibration exciter 27, 28 is positioned centrally with respect to the length of the measuring tube, on the outside of the measuring tube remote from the other measuring tube, and on an exciter axis 37 lying in the plane of vibration, i.e., in the plane of the paper in FIG. 2. Although this arrangement of the vibration exciters 27, 28 practically forces the vibration in the aforementioned plane, so that vibrations in the other planes should not occur, it is advantageous to suppress any vibrations still occurring in those other planes by providing a flat projecting member 40, 41; 42, 43 per measuring tube on the side of each node plate 25, 26 remote from the manifold, such that the flat projecting member forms an angle with the plane of vibration and contains the axis of the respective measuring tube. In the preferred embodiment of FIG. 2, the flat projecting members are perpendicular to the plane of the paper.

Positioned along each measuring tube 23, 24 are two 10 electrodynamic sensors 29, 30; 31, 32 for picking up the vibrations of the tubes. Preferably, the sensors 29, 30 associated with the measuring tube 23 and the sensors 31, 32 associated with the measuring tube 24 are located at the same distance from the center of the respective tube, on the outside of the tube remote from the other tube, and on respective sensor axes 38, 39 lying in the plane of vibration.

By means of the pair of sensors 29, 31 and the pair of sensors 30, 32, two electric signals are generated which differ with respect to the vibrations of the measuring tubes at the locations of the sensors. From the phase difference between these signals, the mass flow rate can be determined in the aforementioned evaluation, drive, and display electronics.

FIG. 3 shows an in-situ vibration exciter or electrodynamic sensor in a cross-sectional view. A nonferromagnetic metal plate 51 soldered to the measuring tube 23 and provided with a nonferromagnetic threaded connecting piece 52 supports a soft ferromagnetic metal cup 53 whose bottom rises on the inside at the center to form a threaded sleeve 54, into which the threaded connecting piece is screwed. The other measuring tube 24 is not shown but must be thought of as extending symmetrically with respect to the lower horizontal centerline.

A permanent-magnet disk 55, which is magnetized in the axial direction of the threaded sleeve 54, is attached, preferably with an adhesive, to the end face of the threaded sleeve. Thus, in FIG. 3, one magnetic pole is at the upper end of the permanent-magnet disk 55.

Fixed to the support tube 14 by means of a coil holder 56 is a coil 57 in which the permanent magnet disk 55 can move freely when the measuring tube vibrates. The coil holder 56 is a suitably shaped plastic part with through holes 59 for the wires of the coil 57, and is fitted in a corresponding bore 60 of the support tube 14.

The coil 57 is thus fixed to the support tube 14, and its leads have no points of mechanical contact or connection with the vibrating measuring tubes 23, 24. This also applies, of course, for the coils of the other five electrodynamic systems, which are not shown in FIG. 3.

For mass flow meters which are installed in conduits with nominal diameters up to about 25 mm, it is particularly advantageous if the mass flow sensors according to the invention are equipped with two vibration exciters and four electrodynamic sensors whose dimensions and electrical values (inductance and ohmic resistance of the coils, etc.) are as identical as possible.

Figure 4:
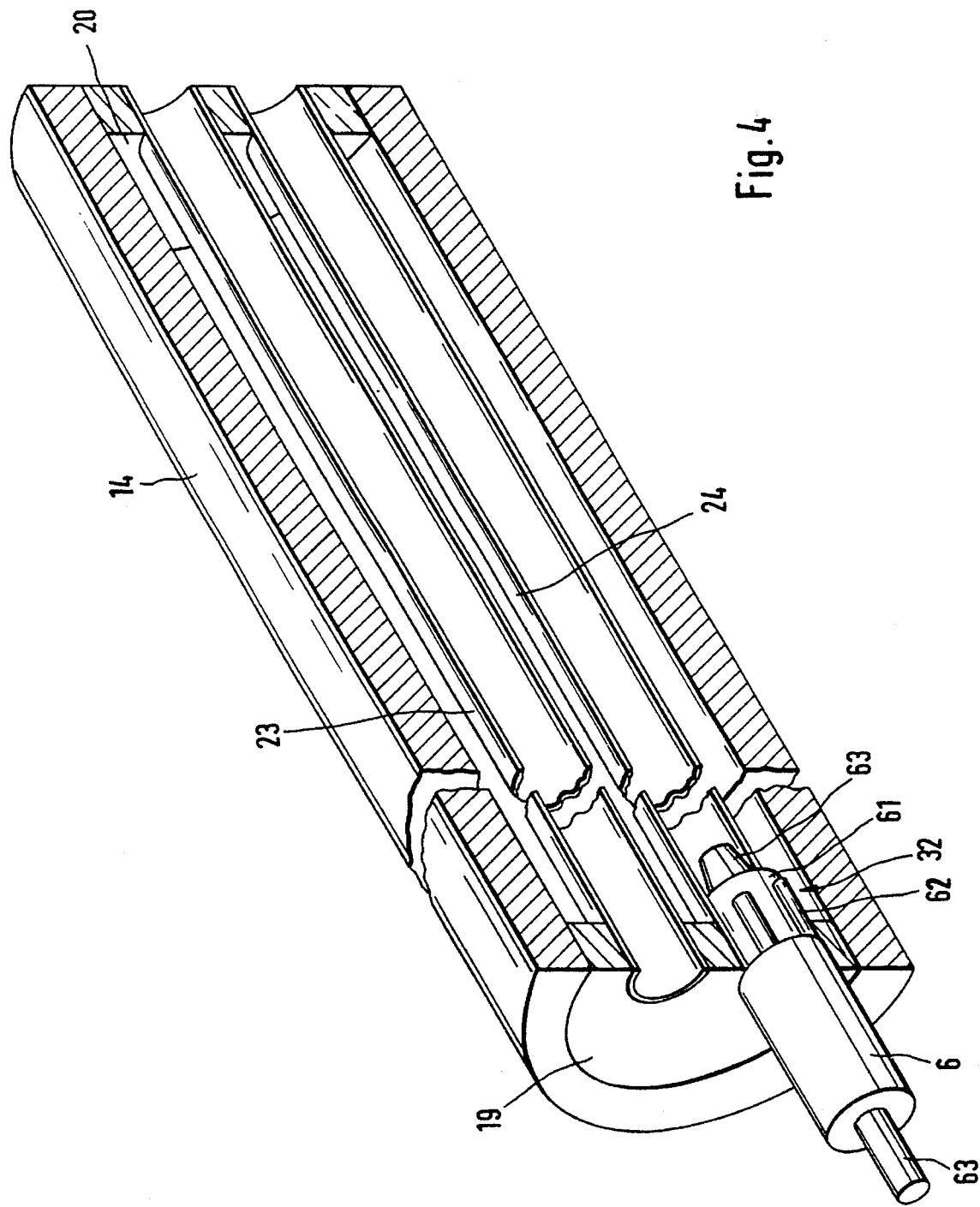
FIG. 4 is a schematic, perspective, partly sectioned view of a mass flow sensor together with a rolling tool as is used during the manufacture of the sensor.

FIG. 4 is a schematic, perspective, partly sectioned view of a mass flow sensor together with a rolling tool 6 as is used in the manufacture of the sensor. Parts which are not necessary to explain this figure are not shown in order to simplify the illustration.

During manufacture, after the two measuring tubes 23, 24 have been introduced into the inlet and outlet manifolds 19, 20, a rolling tool 6 is inserted into the lumen of the end of the respective measuring tube. At its front end (as seen in the direction of insertion), the rolling tool 6 carries a cage 61 with rollers 62 distributed around its circumference and rotatably mounted within corresponding openings. Such a rolling tool for attaching boiler or heat-exchange tubes is described, for example, in U.S. Pat. No. 4,090,382.

The circle along which the rollers 62 move during rotation of the rolling tool 6 has a radius which can be adjusted by means of a member 63 that is movable in the direction of insertion. By increasing this radius as compared with the radius with which the rolling tool 6 is first inserted into the lumina of the measuring tubes 23, 24, the ends of these tubes are press-bonded to the walls of the bores in the inlet and outlet manifolds 19, 20, respectively. This occurs without any energy supply, particularly without heat supply. The press bonding results in a slight plastic flow of the material of the measuring tubes 23, 24, and thus in a very firm mechanical joint in these areas.

Furthermore, the wall thickness of the ends of the measuring tubes 23, 24 becomes slightly thinner, which results in compressive stress in the longitudinal direction of the respective measuring tube, henceforth called "axial stress" since the measuring tubes would become slightly longer if they were not clamped in the support tube 14. Within the respective bores, compressive stress is exerted in the radial direction, henceforth called "radial stress".

The radial stress is due to the fact that during the press bonding, the end portions of the measuring tubes 23, 24 are plastically deformed, while the inlet and outlet manifolds 19, 20, because of their greater thickness in comparison with the end portions, are deformed essentially elastically, so that after the press bonding, the inlet and outlet manifolds exert a radial force toward the center of the end portions.

The radial stress is the primary reason why stress-corrosion cracking, which invariably occurs in prior art mass flow sensors because the end portions of their measuring tubes are soft-soldered or brazed or welded into the inlet and outlet manifolds, can be virtually avoided. The axial stress also contributes to avoiding stress-corrosion cracking, but to a much smaller extent.

The inventors were surprised to find that the press bonding described, which was hitherto used only with nonmoving, particularly nonvibrating, tubes, namely with boiler or heat-exchanger tubes, can be used particularly successfully with measuring tubes of mass flow sensors, which vibrate in operation, and that the above disadvantages of the soldering, brazing or welding operation can thus be avoided.

The press bonding just explained can also be used with advantage to achieve an optimum dynamic balance of the measuring tubes. This will now be illustrated by the example of the mass flow sensor of FIGS. 1 to 4.

First, the inlet and outlet manifolds 19, 20 are fixed in the support tube 14; the support tube and the inlet and outlet manifolds can also be of one-piece construction. Then, the ends of the measuring tubes 23, 24 are positioned within the associated bores of the inlet and outlet manifolds 19, 20 and are pre-pressbonded to the bore walls over the entire length of the bores by rotating the rolling tool 6 therein; "pre-pressbonded" means that the full pressing pressure is not applied yet.

Next, the end of one of the measuring tubes, 23, is press-bonded to the wall of the bore in the inlet manifold 19 with the full pressing pressure. Thereafter, the end of the other measuring tube 24 is press-bonded in the inlet manifold 19 by means of the rolling tool 6 only until the measuring tubes are dynamically optimally balanced, i.e., the member 63 of the rolling tool 6 is moved and simultaneously rotated until balance is achieved.

Finally, the pre-press-bonded end of the measuring tube 23 is press-bonded to the wall of the bore of the outlet manifold 20 with the full pressing pressure. Then, the pre-press-bonded end of the other measuring tube 24 is press-bonded by means of the rolling tool 6 until the two measuring tubes are dynamically optimally balanced.

To determine the optimum dynamic balance, an acceleration sensor is disposed on the support 14. The press bonding is performed only until the signal of this sensor has a minimum.

If the ends of the respective bores and the ends of the respective measuring tubes are to be aligned after the press bonding, the corresponding surfaces of the inlet and outlet manifolds—in the case of the inlet manifold 19 the front surface which can be seen in FIG. 4—can be covered with a device serving as a stop, or the respective measuring tube will be inserted not quite up to the end of the bore.

We claim:

1. A Coriolis-type mass flow sensor installed in a conduit of a given diameter so as to be axially aligned with said conduit, where the conduit carries a fluid to be measured, the mass flow sensor comprising:

an inlet tube and an outlet tube configured to connect the mass flow sensor with the conduit, an inlet manifold and an outlet manifold, an external support tube having ends fixed to the inlet manifold and the outlet manifold, respectively, and with their faces to the inlet tube and the outlet tube, respectively, two parallel, straight measuring tubes of the same inside diameter and the same wall thickness each having its two ends fixed in parallel bores of the inlet manifold in alignment with the inlet tube and in parallel bores of the outlet manifold in alignment with the outlet tube, respectively, two node plates interconnecting the two measuring tubes near the inlet manifold and the outlet manifold, respectively, one vibration exciter per measuring tube which vibration exciters are mounted opposite each other and excite the measuring tubes into oppositely directed resonance vibrations in only one plane of vibration, and a pair of spaced-apart electrodynamic sensors positioned along each of the measuring tubes for sensing the vibrations of the measuring tubes, the pair of electrodynamic sensors positioned along one measuring tube being located opposite the pair of electrodynamic sensors positioned along the other measuring tube.

2. A mass flow sensor as claimed in claim 1 wherein the respective vibration exciter is disposed centrally with respect to the length of the measuring tube, on the outer side of the measuring tube remote from the other measuring tube, and on an exciter axis lying in the plane of vibration.

3. A mass flow sensor as claimed in claim 1 wherein the respective sensors associated with one measuring tube are disposed at the same distance from the center of the measuring tube, on the outer side of the measuring tube remote from the other measuring tube, and on a respective sensor axis lying in the plane of vibration.

4. A mass flow sensor as claimed in claim 1 wherein the two vibration exciters and the four sensors preferably comprise the following parts:

a nonferromagnetic metal plate soldered to the respective measuring tube and having a nonferromagnetic threaded connecting piece, a soft ferromagnetic metal cup whose bottom rises on the inside at the center to form a threaded sleeve into which the threaded connecting piece is screwed, a permanent-magnet disk which is attached, preferably with an adhesive, to the end surface of the threaded sleeve and which is magnetized in the axial direction of the threaded sleeve, and a coil mounted on the support tube by means of a coil holder such that the permanent-magnet disk can move freely in the coil.

5. A mass flow sensor as claimed in claim 4 wherein the two vibration exciters and the four sensors preferably have the same respective dimensions.

6. A mass flow sensor as claimed in claim 1 wherein on the side of each node plate remote from the manifold, two flat projecting members per measuring tube are provided so as to lie in a plane which is perpendicular to the plane of vibration and contains the axis of the respective measuring tube.

7. A mass flow meter as claimed in claim 1 further comprising flat projecting members connected to the node plates and measuring tubes and wherein the two measuring tubes, the inlet manifold, the outlet manifold, the node plates, and the flat projecting members are made of titanium or a titanium alloy or zirconium, and wherein the inlet tube and the outlet tube are made of high-grade steel.

8. A mass flow sensor as claimed in claim 1 wherein the ends of at least one of the measuring tubes are pressbonded to the walls of the bores in the inlet manifold and outlet manifold, respectively, without heat supply using a rolling tool which is inserted into the respective end.

9. A mass flow sensor as claimed in claim 8 wherein the two measuring tubes are press-bonded in the inlet manifold and outlet manifold, respectively, only until they are dynamically optimally balanced.

10. A mass flow meter as claimed in claim 6 wherein the two measuring tubes, the inlet manifold, the outlet manifold, the node plates, and the flat projecting members are made of titanium or a titanium alloy or zirconium, and wherein the inlet tube and the outlet tube are made of high-grade steel.

11. A Coriolis-type mass flow sensor installed in a conduit of a given diameter so as to be axially aligned with the conduit, where the conduit carries a fluid to be measured, the mass flow sensor comprising:

an inlet tube and an outlet tube which serve to connect the mass flow sensor with the conduit, an inlet manifold and an outlet manifold, an external support tube having ends fixed to the inlet manifold and the outlet manifold respectively, and with their faces to the inlet tube and the outlet tube, respectively, two node plates interconnecting the two measuring tubes near the inlet manifold and the outlet manifold, respectively, one vibration exciter per measuring tube, the vibration exciters are mounted on the measuring tubes opposite each other and they excite the measuring tubes into oppositely directed resonance vibrations in only one plane of vibration, two flat projecting members provided on each node plate and extending along the axis of each measuring tube so as to be in a plane which is perpendicular to the plane of vibration, and a pair of spaced-apart electrodynamic sensors positioned along each of the measuring tubes for sensing the vibrations of the measuring tubes, the pair of electrodynamic sensors positioned along one measuring tube being located opposite the pair of electrodynamic sensors positioned along the other measuring tube.

* * * * *